Patented Dec. 4, 1951

2,577,445

UNITED STATES PATENT OFFICE

2,577,445

PREPARING METHACROLEIN FROM THE DIMER THEREOF

Newman M. Bortnick, Philadelphia, Pa., assignor to Röhm & Haas Company, Philadelphia, Pa., a corporation of Delaware No Drawing. Application November 4, 1947, Serial No. 784,084

3 Claims. (Cl. 260—601)

This invention deals with the dimer of methacrolein and with its pyrolysis to methacrolein.

I have found that when methacrolein is allowed to stand at room temperature, particularly in the presence of a polymerization inhibitor, such as hydroquinone, resorcinol, or beta-naphthol, a high boiling liquid slowly forms. This liquid is distillable at 171–2° C. at atmospheric pressure. It corresponds by analysis to $C_8H_{10}O_2$ and has the apparent structure of 2,5-dimethyl-2-formyl-2,3-dihydropyran,

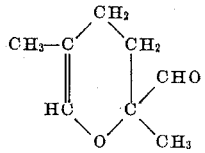

This compound forms a mono-semi-carbazone, melting at 174–7° C.

It has been further found that this compound can be prepared from methacrolein by heating the latter under pressure. Thus, when methacrolein is heated at 100° to 138° C. in a sealed tube for seven hours, a yield of 92% of the dimer is obtained.

Since the dimer gives a set of reactions different from that of methacrolein itself, it is desirable to have available a method for converting the dimer to methacrolein when reactions are to be directed to use of the latter. Otherwise the high boiling product obtained from methacrolein causes a serious loss.

It has been discovered that methacrolein is obtained by pyrolyzing the dimer between 250° C. and 550° C. under normal, reduced, or increased pressure and preferably by heating it at 350° C. to 450° C. Pyrolysis may be accomplished by passing the vapors of the dimer through a tube heated at these temperatures and collecting the product. The tube may, if desired, be packed with a refractory inorganic material, such as quartz, tabular aluminum oxide, or silicon carbide, to present an extended heated surface.

The dimer need not be vaporized in a separate operation but may, if desired, be run directly onto packing in a hot tube. For example, the dimer of methacrolein was run slowly into a vertical tube of 25 mm. outside diameter, packed with 100 cc. of 4-8 mesh quartz and electrically heated by a resistance winding about the tube. The dimer was pyrolyzed and the vapors from the tube were condensed in an ice-cooled trap. No gaseous products were obtained.

When the tube was heated at 355° C., a yield of 70% of methacrolein was obtained with the rate of feed at 0.63 gram mole of dimer per hour. When the tube was heated at 385° C., a yield of 97% was obtained at a rate of feed of 0.51 mole of dimer per hour. At 440° C. and a rate of feed of 0.57 mole of dimer per hour, a conversion of 100% was obtained. At 300° C. and a feed rate of 0.7 mole per hour, a conversion of 35% to 40% of the added material was obtained per pass. By fractionation of the product, pure methacrolein was obtained and the unreacted dimer was recycled.

This invention makes possible the efficient utilization of methacrolein after storage. After dimer has been formed in the methacrolein, the stored product is fractionated to take off methacrolein. The residue is then pyrolyzed by the above-described process to revert the dimer to methacrolein. Methacrolein may also be stored for long periods of time in the form of the dimer without losses resulting from oxidation or resinification or the like. When methacrolein is desired, it may readily be prepared in pure form from the stored dimer by the process described above.

The dimer is furthermore a useful compound in its own right, serving as an intermediate for the preparation of alcohols upon reduction and interesting new esters derivable therefrom.

I claim:

1. The process of preparing methacrolein from the dimer thereof which is identified by boiling at 171°–172° C. and forming a semicarbazone melting at 174°–177° C. which comprises pyrolyzing said dimer by heating it between 250° C. and 550° C.

2. The process of preparing methacrolein from the dimer thereof which is identified by boiling at 171°–172° C. and forming a semicarbazone melting at 174°–177° C. which comprises pyrolyzing said dimer by heating it at 350° C. to 450° C.

3. The process of preparing methacrolein from the dimer thereof which is identified by boiling at 171°–172° C. and forming a semicarbazone melting at 174°–177° C. which comprises passing the dimer into a reaction zone heated at 350° C. to 450° C. and withdrawing therefrom methacrolein.

NEWMAN M. BORTNICK.

REFERENCES CITED

The following references are of record in the file of this patent:

UNITED STATES PATENTS

| Number | Name | Date |
|---|---|---|
| 2,368,186 | Wickert | Jan. 30, 1945 |
| 2,387,366 | Toussaint | Oct. 23, 1945 |
| 2,427,492 | Bremner et al | Sept. 16, 1947 |
| 2,451,712 | Bremner et al. | Oct. 19, 1948 |
| 2,479,283 | Whetstone | Aug. 16, 1949 |
| 2,479,284 | Whetstone | Aug. 16, 1949 |

OTHER REFERENCES

Adler et al.: Chemical Abstracts, vol. 35, 1941, page 6956.

Sherlin et al.: Chemical Abstracts, vol. 32, 1938, page 5398.